UNITED STATES PATENT OFFICE.

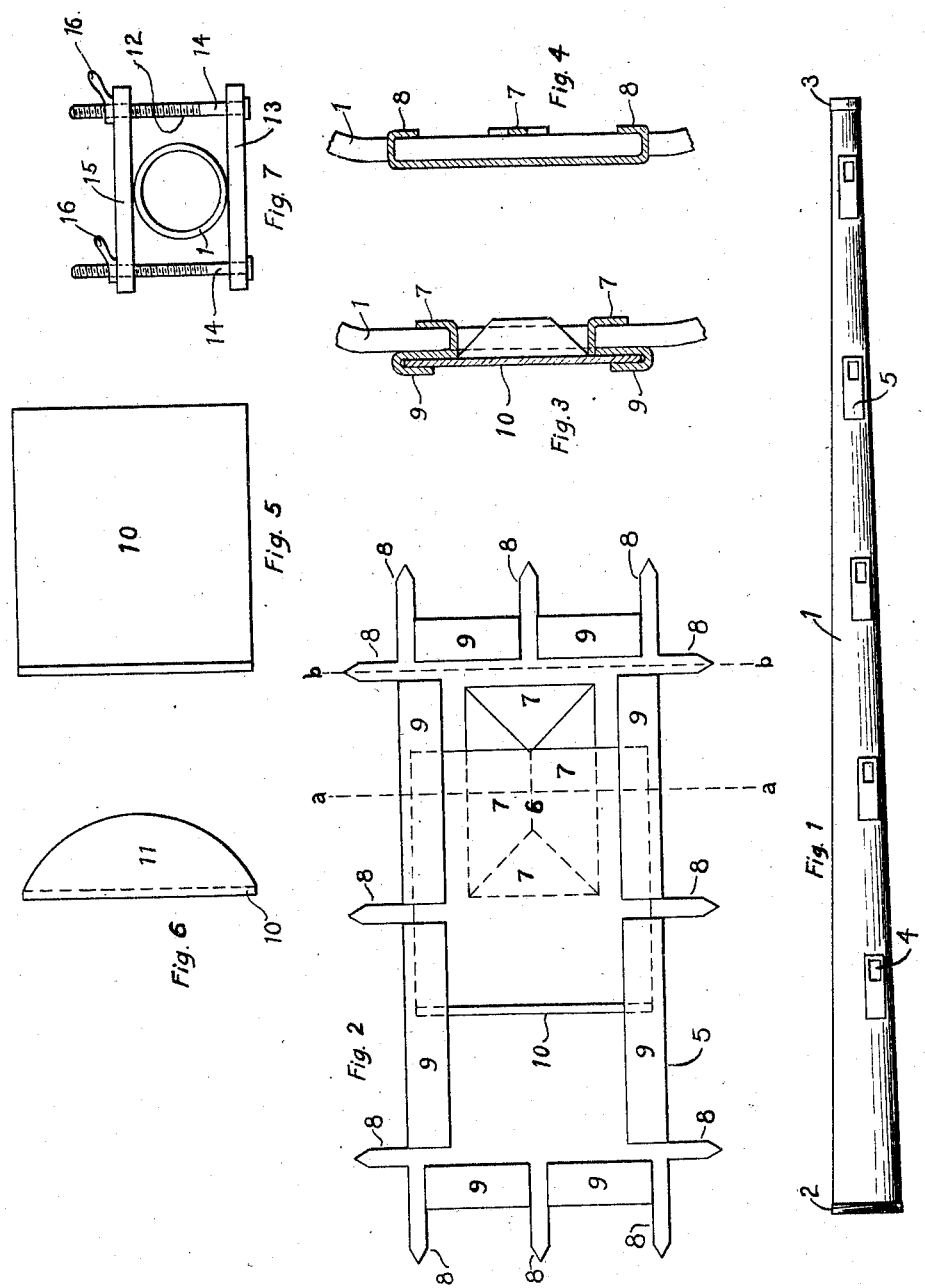

ELMER L. LINXWEILER, OF NEAR ALLISON, COLORADO.

IRRIGATING-CONDUIT.

1,043,118.   Specification of Letters Patent.   Patented Nov. 5, 1912.

Application filed April 13, 1912. Serial No. 690,603.

*To all whom it may concern:*

Be it known that I, ELMER L. LINXWEILER, a citizen of the United States, residing in the county of Archuleta, near the town of Allison, State of Colorado, have invented new and useful Improvements in Irrigating-Conduits, of which the following is a specification.

My invention relates to new and useful improvements in irrigating conduits.

The principal object of my invention is to provide a cheap, simple and effective means for distributing irrigating water, and is more particularly adapted to the furrow system of irrigation.

The great difficulty experienced in irrigating systems, of preventing an oversupply of water from washing land out of a furrow and depositing large quantities of silt therein, demands a system which will more evenly apportion the water to the furrows and prevent the deposit of silt in the same. A system of irrigation which will uniformly distribute the water to each furrow by night with equal accuracy and faithfulness as by day, is also desired, as irrigation by night is more effective than by day due to the influence of the sun's rays on the evaporation of the water.

With a view of meeting the above requirements, as well as others which will hereinafter be specified, my invention is designed, and consists of a light, flexible conduit of tapering form for distributing the irrigation water through apertures therein, to the several furrows. These apertures are spaced at suitable distances apart, and are respectively protected from wear and enlargement by devices to be hereinafter described, which also serve to regulate the flow of water through said apertures. The extreme flexibility of my conduit enables it to be easily carried from one place to another and to accommodate itself to uneven surfaces such as slopes, gulleys, etc., while its tapering quality insures a uniform flow of water through the apertures before referred to. This even distribution of the water is of great value to the crops in providing a uniform growth as opposed to methods which put too much water in some places and not enough in others.

With the above and other incidental objects in view, my invention consists in the certain novel arrangement and construction of parts to be hereinafter described in the following specification and particularly pointed out in the subjoined claim.

In the accompanying drawings, Figure 1 is a side view of my irrigating conduit. Fig. 2 is a detail view of the device for regulating the flow of water through the conduit apertures, as well as protecting the latter from wear and enlargement. Fig. 3 is a section on the line *a—a* of Fig. 2, showing my regulating and protecting device in position over an aperture of the conduit. Fig. 4 is a section on the line *b—b* of Fig. 2, showing the method of clenching my regulating and protecting device to the conduit. Fig. 5 is a plan view of the slide for opening and closing the aperture of the regulating and protecting device. Fig. 6 is an end view of the same, showing the lip for moving the slide. And Fig. 7 is a side view of the clamp for closing the conduit.

Throughout the specification and drawings, like reference characters denote corresponding parts.

In a detailed description of my invention, 1 designates a flexible conduit or hose made of canvas or other suitable flexible material, and tapering throughout its length. The large end of the conduit 1 is provided with an externally screw-threaded steel coupling 2, whereby the said conduit may be connected to a pipe or flume for the purpose of receiving irrigating water therefrom. The other end of the conduit 2 is provided with an internally screw-threaded steel coupling 3 adapted to receive another section of a similarly constructed conduit when an increase in length is desired. Provided in the conduit 1, at suitable distances apart, are apertures 4, preferably of the form of an oblong rectangle, each aperture being adapted to deliver water directly to a furrow. In order to insure a uniform flow of water through the apertures 4, my conduit is made of tapering form, since in a cylindrical conduit the water would diminish in volume as it flows along, thereby delivering too much water to some furrows and not enough to others, as well as depositing silt in shallow places.
For the purpose of protecting the apertures 4 from wear and enlargement, as well as providing means for regulating the flow of water therethrough, I provide an apertured plate 5 which is adapted to be fitted over each aperture. This plate is made of thin metal, is preferably of the form of an oblong rectangle, and is constructed as follows: Referring to Fig. 2, 5 represents the metallic plate in which is provided an aperture 6 of sufficient size and shape to register with an aperture 4 of the conduit 1. The aperture 6 is formed in the plate 5 in such a manner as to provide four flap portions 7. When the plate 5 is applied to the conduit 1 so that the apertures 6 and 4 register with each other, the flap portions 7 are first bent down through the aperture 4 and then back upon the interior surface of the conduit, whereby they serve not only as means for clamping the plate to the hose, but also as means for protecting the edges of the apertures 4 from enlargement and wear, see Fig. 3. The apertured plate 5 is also scored and cut to form 12 tongue-like projections 8, three on each side, to form means for clenching the plate to the conduit in the following manner: When the plate 5 is applied to the conduit 1 in the manner before stated, these projections 8 are forced through the said conduit and then bent down upon its inner surface, as is shown in Fig. 4, whereby the plate and conduit are firmly united. The projections 8 are so cut or stamped from the plate 5 as to leave between them longitudinal flap portions 9. These flap portions 9 are eight in number, the two formed on the upper side of the plate being similar to the two formed on the lower, and the two formed on one end of said plate are similar to the two formed on the other end. The upper and lower flap portions 9 form guiding and retaining means for a slide 10, which is longitudinally movable therein to open and close the aperture 6 of the plate 5, see Figs. 2, 3 and 5. The slide 10 is provided at one end with a lip 11 adapted to be gripped by the hand of a person adjusting the slide. While I have shown a curved lip for this purpose, any other suitable gripping medium may be employed. By adjusting the slide 10 with reference to the aperture 6, the quantity of water flowing through said aperture from the flexible conduit 1 may be regulated to suit varying conditions of use.

Referring to Fig. 7, 12 designates a clamp adapted to be fitted over the conduit 1 to close any portion of the same. The said conduit, being open at both ends, may be cleaned at any time, and when it is desired to close the lower end, or any other portion of the same, the said clamp is applied to the conduit at the particular place it is desired to close it. For example, if a short length of hose is desired, the said conduit 1, being flexible, may be bent upon itself and the clamp applied at its middle portion, whereupon the irrigating water will flow only through those apertures which are located between the large end of the conduit and the clamp. While any suitable clamp may be employed, the one herein shown is constructed as follows: Into a transverse member 13 are fitted two screw-threaded bolts 14. These bolts 14 are adapted to receive a transverse member 15, vertically adjustable thereon, and also handles 16 to move said member 15 into engagement with the conduit 1 and thereby close the same at any desired point.

In order to add to the imperviousness and durability of the conduit 1, it may be treated with a water-proofing or preservative fluid.

In operation, the water admitted to the conduit 1 from the irrigation pipe or flume (not shown), will flow through said conduit to the place where the clamp 12 is applied, and will be distributed, through the apertures 4 between the end of the conduit and the clamp, to the furrows of a field or orchard. The amount of water flowing through the apertures 4 may be controlled by adjusting the slide 10 in the apertured plate 5. The fact that the conduit is tapering, in connection with the further fact that the amount of water flowing through each aperture may be regulated, makes it possible to provide for a very minute flow into each furrow, as well as a uniform flow.

My invention is not limited to the details of construction and arrangement herein shown and described, but the character of the means employed may be varied to suit different conditions of use.

Having described my invention, I claim:

A flexible irrigating conduit for distributing water into furrows, apertures in said conduit spaced apart at suitable distances to communicate with the furrows, and one for each furrow, a plate fitted over each aperture and provided with an opening registering with said aperture, tongues projecting from said plate, said tongues extending through the aperture and being turned down upon the interior surface of the conduit to secure the plate to said conduit, and a slide movable in said plate to open and close the opening in the plate to regulate the flow of water therethrough, said conduit tapering throughout its length to insure an even distribution of water through said apertures, substantially as described.

In testimony whereof I have hereunto set my hand this 6th day of April, 1912.

ELMER L. LINXWEILER.

Witnesses:
W. R. FRASER,
A. L. KROEGER.